(12) United States Patent
Kasaiezadeh Mahabadi et al.

(10) Patent No.: US 11,052,757 B2
(45) Date of Patent: Jul. 6, 2021

(54) METHODS OF CONTROLLING AXLE TORQUE DISTRIBUTION

(71) Applicant: GM Global Technology Operations LLC, Detroit, MI (US)

(72) Inventors: SeyedAlireza Kasaiezadeh Mahabadi, Shelby, MI (US); Yubiao Zhang, Waterloo (CA); Seyedeh Asal Nahidi, North York (CA); James H. Holbrook, Fenton, MI (US); John R. Yost, Southfield, MI (US); Hualin Tan, Novi, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 319 days.

(21) Appl. No.: 16/376,318

(22) Filed: Apr. 5, 2019

(65) Prior Publication Data

US 2020/0317048 A1    Oct. 8, 2020

(51) Int. Cl.
*B60K 23/08* (2006.01)
*B60K 17/35* (2006.01)
*B60K 23/04* (2006.01)

(52) U.S. Cl.
CPC ...... *B60K 17/3515* (2013.01); *B60K 23/0808* (2013.01); *B60K 2023/043* (2013.01); *B60K 2023/0858* (2013.01); *B60K 2702/06* (2013.01)

(58) Field of Classification Search
CPC ............ B60K 17/3515; B60K 23/0808; B60K 2023/043; B60K 2023/0858; B60K 2702/06; B60K 2023/085; B60K 17/354; B60K 1/02; B60W 10/06; B60W 40/105; B60W 40/10; B60W 40/00; B60W 2520/10; B60W 2510/0657; B60W 2510/20; B60W 2510/18; B60W 2050/0043; B60W 2710/0666
See application file for complete search history.

(56) References Cited

U.S. PATENT DOCUMENTS

| | | | | |
|---|---|---|---|---|
| 7,392,120 | B2 * | 6/2008 | Matsumoto | B60T 8/17557 180/168 |
| 2002/0002433 | A1 * | 1/2002 | Matsuno | B60K 23/04 701/67 |
| 2007/0112499 | A1 * | 5/2007 | Matsuno | B60W 10/184 701/93 |
| 2008/0262692 | A1 * | 10/2008 | Kogure | B60W 40/068 701/90 |
| 2009/0319114 | A1 * | 12/2009 | Takenaka | B60W 10/18 701/48 |

* cited by examiner

*Primary Examiner* — Justin Holmes
(74) *Attorney, Agent, or Firm* — Quinn IP Law

(57) ABSTRACT

Methods of controlling axle torque distribution of a vehicle during steering through a curve include collecting, via a controller: input data which is representative of a plurality of vehicle inputs; vehicle data which is representative of axle torque of the front axle and axle torque of the rear axle; and constraint data which is representative of real-time constraints of the vehicle. The collected input data, vehicle data and constraint data are communicated to a predictive model. Determining, using the predictive model, whether torque adjustments are necessary. The distribution of the axle torque of the front axle and the axle torque of the rear axle is controlled, via the controller, when the torque adjustments are necessary as determined via the predictive model.

19 Claims, 2 Drawing Sheets

METHODS OF CONTROLLING AXLE TORQUE DISTRIBUTION

Vehicles have been designed with different drive systems. For example, some vehicle drive systems may be rear-wheel drive, front-wheel drive or all-wheel drive (AWD). Depending on the drive system configuration, the vehicle may have a tendency to move a certain way during steering of the vehicle along a road. For example, as an AWD vehicle travels along a curve of a road, axle torque may cause understeering of the vehicle or oversteering of the vehicle. To change understeering or oversteering, a first actuator may be coupled to a front axle to adjust axle torque and a separate and independent second actuator may be coupled to rear axle to adjust axle torque. However, torque information remains separate for the first and second actuators.

SUMMARY

The present disclosure provides a method of controlling axle torque distribution of a front axle and a rear axle of a vehicle during steering of the vehicle through a curve. The method includes collecting, via a controller: input data which is representative of a plurality of vehicle inputs; vehicle data which is representative of axle torque of the front axle and axle torque of the rear axle; constraint data which is representative of real-time constraints of the vehicle; and communicating the collected input data, vehicle data and constraint data to a predictive model. The predictive model includes an estimation model configured to output a plurality of estimated vehicle states and a reference model configured to output a plurality of target values of desired responses. The method includes determining, using the predictive model, whether torque adjustments are necessary, including comparing the estimated vehicle states from the estimation model to the plurality of target values from the reference model. The method includes controlling the distribution of the axle torque of the front axle and the axle torque of the rear axle, via the controller, when the torque adjustments are necessary as determined via the predictive model.

The predictive model may include the equations: $\dot{x} = \overline{A}_c x + \overline{B}_c u + \overline{d}_c$; and $y = C_c x$; wherein: $x = [v_y \; r \; M_{z_{CG}}]^T$; $y = [v_y \; r]^T$; $v_y$=a lateral velocity of the vehicle at a center of gravity (CG) point; r=a yaw rate of the vehicle at the CG point; $M_{z_{CG}}$=a total yaw moment of the vehicle at the CG point; $u = [\Delta T_f \; \Delta T_r \; \Delta T_e]^T$; $\Delta T_f$=adjustment of the front axle torque; $\Delta T_r$=adjustment of the rear axle torque; and $\Delta T_e$=adjustment of a clutch of an electronic limited slip differential.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
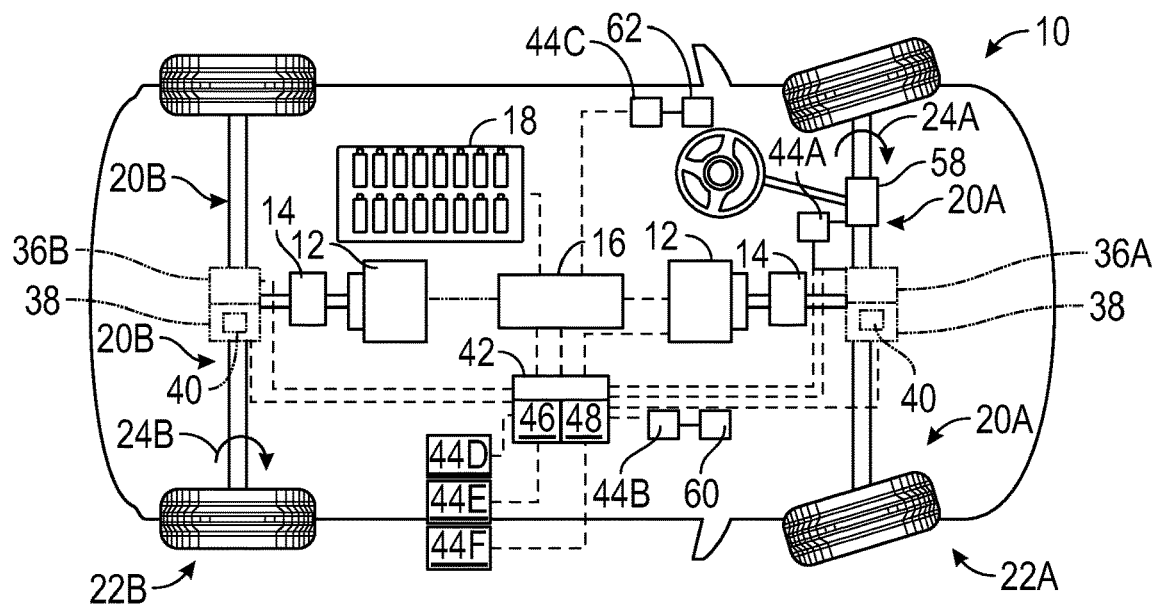
FIG. 1 is a schematic illustration of a vehicle.

Referring to the FIGS., wherein like numerals indicate like or corresponding parts throughout the several views, a vehicle 10 is generally shown in FIG. 1. Non-limiting examples of the vehicle 10 may include cars, trucks, all-terrain vehicles, off-road vehicles, recreational vehicles, aircrafts, boats, watercrafts, farm equipment or any other suitable movable platform.

Continuing with FIG. 1, the vehicle 10 may include an engine 12 and a transmission 14 coupled to the engine 12. Any suitable engine 12 may be utilized, and non-limiting examples may include an internal combustion engine, one or more electric motor(s), etc., and combinations thereof. Generally, the transmission 14 is coupled to the engine 12 to receive torque outputted from the engine 12. FIG. 1 is illustrative of the ability of having two electric motors, in which each of the electric motors are electrically connected to a power inverter 16, and the ability of having a different option in which one electric motor electrically connected to the power inverter 16 and a separate internal combustion engine which is not electrically connected to the power inverter 16. The phantom lines (dash-dot-dot-dash lines) between the power inverter 16 and one of boxes labeled number 12 indicates the optional electric connection depending on the type of engine 12 being used. The power inverter 16 is in electrical communication with a power source 18, such as one or more batteries, etc.

The engine 12 may include an output shaft, and the transmission 14 may include an input member. The output shaft of the engine 12 rotates at an engine speed, and torque from rotation of the output shaft is transferred to the input member of the transmission 14, which causes the input member to rotate. The powertrain of the vehicle 10 may include one or more electric traction motors in an optional hybrid configuration to provide additional sources of input torque. Non-limiting examples of the transmission 14 may include automatic transmission, dual clutch transmission, automated manual transmission, continuously variable transmission (CVT), etc.

The transmission 14 may include a final drive coupled to the input member of the transmission 14 and an output member that delivers output torque to one or more drive axles 20A, 20B through the final drive, and ultimately to a set of tires 22A, 22B. Therefore, torque from the engine 12 is transferred to the transmission 14, and the transmission 14 outputs torque 24A, 24B to drive one or more of the tires 22A, 22B. It is to be appreciated that the final drive may be driven by an endless rotatable member, and non-limiting examples of the endless rotatable member may include a belt or a chain.

In certain configurations, the vehicle 10 may be a front-wheel drive vehicle in which the torque 24A is delivered to a front axle 20A to drive front tires 22A of the vehicle 10. In other configurations, the vehicle 10 may be a rear-wheel drive vehicle in which the torque 24B is delivered to a rear axle 20B to drive rear tires 22B of the vehicle 10. In yet other configurations, the vehicle 10 may be an all-wheel drive (AWD) vehicle in which the torque 24A, 24B is delivered to the front axle 20A and the rear axle 20B to drive the respective front tires 22A and the respective rear tires 22B of the vehicle 10. Torque 24A, 24B may also be referred to as axle torque 24A, 24B herein.

Figure 2:
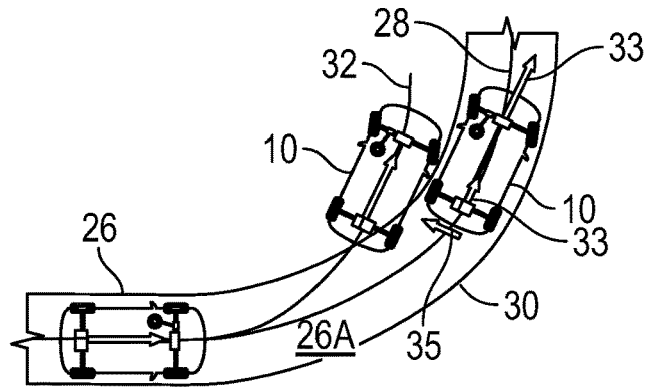
FIG. 2 is a schematic illustration of the vehicle traveling along a road in a desired path and an oversteering path.
Figure 3:
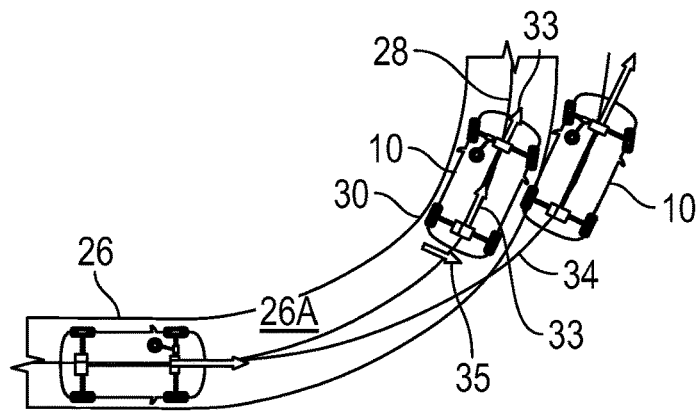
FIG. 3 is a schematic illustration of the vehicle traveling along the road in the desired path and an understeering path.

Referring to FIGS. 2 and 3, when the vehicle 10 travels along a road 26, it is desirable to maintain the vehicle 10 along a desired path 28. As the vehicle 10 travels through a curve 30 in the road 26, it is desirable to minimize oversteering (see FIG. 2; oversteering path 32) and understeering (see FIG. 3; understeering path 34) of the vehicle 10 through the curve 30. Oversteering of the vehicle 10 is when the vehicle 10 travels through the curve 30 sharper than the desired path 28. Generally, oversteering occurs when too much of the torque 24B is transferred to the rear tires 22B when the vehicle 10 travels around the curve 30. Understeering of the vehicle 10 is when the vehicle 10 travels through the curve 30 straighter than the desired path 28. Generally, understeering occurs when too much of the torque 24A is transferred to the front tires 22A as the vehicle 10 travels around the curve 30.

Various mechanisms may be utilized to minimize oversteering and understeering of the vehicle 10, as well as improve stability and handling of the vehicle 10. For example, controlling the torque 24A, 24B to the tires 22A, 22B may improve stability and handling, and minimize oversteering and understeering. The torque 24A, 24B to the tires 22A, 22B may be controlled linearly (linearly examples are shown via arrows 33) and/or laterally (laterally examples shown via arrow 35), which may be referred to as torque split. With regard to linearly, front-rear torque split may include front axle 20A to rear axle 20B, or rear axle 20B to front axle 20A. With regard to laterally, the torque 24A, 24B may be controlled side to side relative to the front axle 20A or the torque 24A, 24B may be controlled side to side relative to the rear axle 20B. For illustrative purposes only, side to side may include left to right, or right to left, and may generally be referred to as left-right torque split.

Turning back to FIG. 1, one way for controlling the torque 24A, 24B is utilizing one or more actuators 36A, 36B. Therefore, for example, the vehicle 10 may include a first actuator 36A coupled to one of the front axle 20A and the rear axle 20B. The first actuator 36A may control the torque 24A, 24B linearly. As such, the first actuator 36A may control front-rear torque split. In certain configurations, the first actuator 36A is coupled to the front axle 20A. The first actuator 36A may be an electric motor or any other suitable type of actuator to control the torque 24A.

In certain configurations, the vehicle 10 may include a second actuator 36B coupled to the other one of the front axle 20A and the rear axle 20B. The second actuator 36B may control the torque 24A, 24B linearly. As such, the second actuator 36B may control front-rear torque split. When the vehicle 10 includes both the first and second actuators 36A, 36B, the first actuator 36A may be coupled to the front axle 20A and the second actuator 36B may be coupled to the rear axle 20B. The second actuator 36B may be an electric motor or any other suitable type of actuator to control the torque 24B.

Additionally, the vehicle 10 may include an electronic limited slip differential (eLSD) 38 coupled to one of the front axle 20A and the rear axle 20B. Generally, the eLSD 38 functions to allow the tires 22A, 22B of one of the axles 20A, 20B to rotate at different speeds while limiting the amount of the torque 24A, 24B delivered to each of the tires 22A, 22B of that axle 20A, 20B. In certain configurations, the first actuator 36A may be coupled to the front axle 20A and the eLSD 38 may be coupled to the rear axle 20B. In other configurations, the first actuator 36A may be coupled to the rear axle 20B and the eLSD 38 may be coupled to the front axle 20A. In yet other configurations, the first actuator 36A may be coupled to the front axle 20A and the second actuator 36B may be coupled to the rear axle 20B and the eLSD 38 may also be coupled to one of the axle 20A, 20B. Therefore, in certain configurations, the eLSD 38 may be coupled to the same axle 20A, 20B as one of the actuators 36A, 36B. FIG. 1 illustrates the first actuator 36A, the second actuator 36B and the eLSD 38 in phantom lines in light of the different variations discussed immediately above.

Regardless of which of the axles 20A, 20B the eLSD 38 is coupled to, the eLSD 38 controls the torque 24A, 24B laterally. As such, the eLSD 38 may control left-right torque split. Generally, if the eLSD 38 is coupled to the front axle 20A, depending on which of the tires 22A of the front axle 20A has a higher velocity as the vehicle 10 travels along the curve 30, the torque 24A, 24B is transferred from the higher velocity tire to the lower velocity tire. Similarly, if the eLSD 38 is coupled to the rear axle 20B, depending on which of the tires 22B of the rear axle 20B has a higher velocity as the vehicle 10 travels along the curve 30, the torque 24A, 24B is transferred from the higher velocity tire to the lower velocity tire.

The eLSD 38 may include a clutch 40 that is configured to selectively engage to transfer the torque 24A, 24B to the tire 22A, 22B that is rotating slower than the other tire 22A, 22B of either the front axle 20A or the rear axle 20B. It is to be appreciated that the eLSD 38 may include other components, which are not discussed herein.

Figure 4:
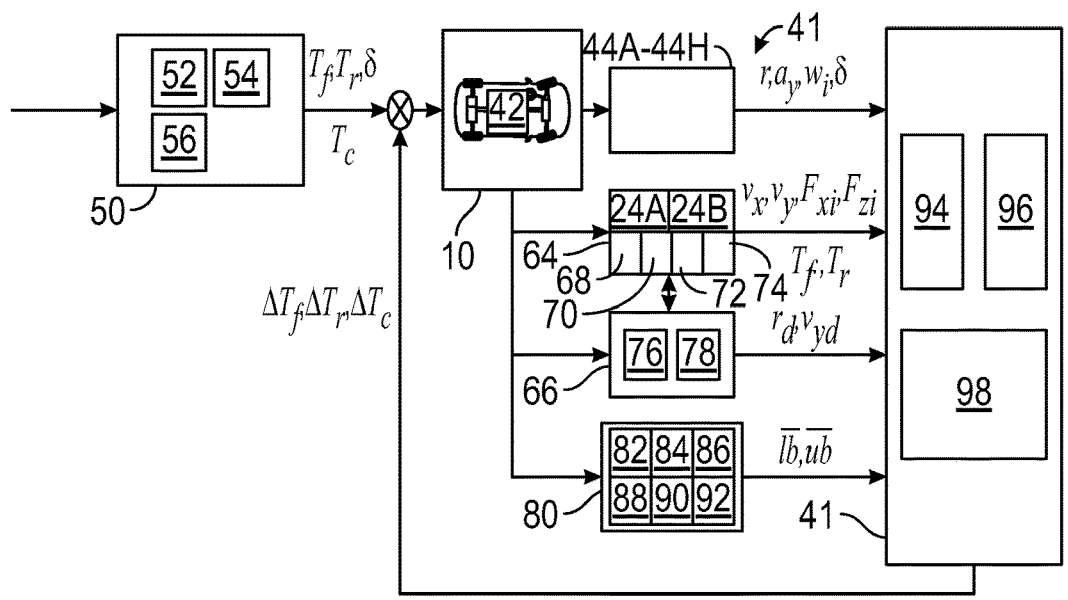
FIG. 4 is a schematic illustration of methods of controlling axle torque distribution.

It is desirable to have the first actuator 36A and/or the second actuator 36B and/or the eLSD 38 cooperating with each other to control axle torque distribution to enhance stability and handling of the vehicle 10. As such, the present disclosure generally provides a method of controlling axle torque distribution of the vehicle 10 during steering of the vehicle 10 around the curve 30. In certain configurations, the present disclosure provides a method of controlling axle torque distribution of the front axle 20A and the rear axle 20B of the vehicle 10 during steering of the vehicle 10 through the curve 30. Referring to FIG. 4, the methods discussed herein may use a predictive model 41 to enhance stability and handling of the vehicle 10. The predictive model 41 may improve yaw tracking and handling, and thus control yaw instability. The predictive model 41 may also be robust to different frictions of the road 26 and tire degradation uncertainty.

Referring to FIGS. 1 and 4, a controller 42 may be utilized to communicate with and/or control various components of the vehicle 10. For example, the controller 42 may be in communication with the engine 12, the first actuator 36A, the second actuator 36B, the eLSD 38, the clutch 40, one or more sensors 44A-F, etc., some of which are discussed below. The controller 42 may collect data regarding actuation of the first actuator 36A, the second actuator 36B and the eLSD 38. The controller 42 may use the data collected from the first actuator 36A, the second actuator 36B and the eLSD 38 to control axle torque distribution of the vehicle 10 along the curve 30. Instructions may be stored in a memory 46 of the controller 42 and automatically executed via a processor 48 of the controller 42 to provide the respective control. The predictive model 41 is stored in the memory 46 of the controller 42.

The controller 42 is configured to execute the instructions from the memory 46, via the processor 48. For example, the controller 42 may be a host machine or distributed system, e.g., a computer such as a digital computer or microcomputer, and, as the memory 46, tangible, non-transitory computer-readable memory such as read-only memory (ROM) or flash memory. The controller 42 may also have as memory 46, random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 42 may include all software, hardware, memory 46, algorithms, connections, sensors 44A-F, etc., necessary to control, for example, various components of the vehicle 10 when using the predictive model 41. As such, a control method operative to control the first actuator 36A and/or the second actuator 36B and/or the eLSD 38, may be embodied as software or firmware associated with the controller 42. It is to be appreciated that the controller 42 may also include any device capable of analyzing data from various sensors, comparing data, making the necessary decisions required to control and/or monitor the various components of the vehicle 10. Optionally, more than one controller 42 may be utilized.

The controller 42 collects input data 50 which is representative of a plurality of vehicle inputs, which as discussed below is communicated to the predictive model 41. The input data 50 may be real-time vehicle inputs as the vehicle 10 is in motion. For example, the vehicle inputs include one or more of a steering angle ($\delta$) 52 (see FIG. 6), an amount of braking 54 and an amount of acceleration 56. Therefore, information regarding the steering angle 52, and/or the amount of braking 54, and/or the amount of acceleration 56 may be communicated to the controller 42. The controller 42 collects data of the vehicle inputs which is communicated to the predictive model 41. Therefore, the vehicle inputs collected via the predictive model 41 include one or more of the steering angle 52, the amount of braking 54 and the amount of acceleration 56.

As the vehicle 10 travels along the road 26, the vehicle 10 is being steered to turn the tires 22A, 22B along the desired path 28, which may occur by a steering assembly 58. The steering assembly 58 may be configured to manually steer the vehicle 10 via a driver using a steering wheel, etc., or may be configured to autonomously steer the vehicle 10 in which the driver does not manually steer the vehicle 10. Regardless of the way the vehicle 10 is being steered, as the tires 22A, 22B turn along the desired path 28, the steering angle 52 changes. A sensor 44A may be coupled to the steering assembly 58 to detect the steering angle 52 of the vehicle 10, which may be communicated to the controller 42. Therefore, the controller 42 may collect data regarding the steering angle 52 which is communicated to the predictive model 41.

To slow down, stop or prevent the vehicle 10 from moving, a brake 60 may be used. A sensor 44B may be coupled to the brake 60 to detect the amount of braking 54 of the vehicle 10, which may be communicated to the controller 42. Therefore, the controller 42 may collect data regarding the amount of braking 54 which is communicated to the predictive model 41.

To propel the vehicle 10, an accelerator 62 may be used. A sensor 44 C may be coupled to the accelerator 62 to detect the amount of acceleration 56 of the vehicle 10, which may be communicated to the controller 42. Therefore, the controller 42 may collect data regarding the amount of acceleration 56 which is communicated to the predictive model 41.

The controller 42 also collects vehicle data which is representative of the axle torque ($T_f$) 24A of the front axle 20A and the axle torque ($T_r$) 24B of the rear axle 20B which as discussed below is communicated to the predictive model 41. The vehicle data may be real-time vehicle data as the vehicle 10 is in motion. The vehicle data collected via the controller may include one or more of the yaw rate (r) of the vehicle 10 at a center of gravity (CG) point 95, the lateral acceleration ($\alpha_y$) of the vehicle 10, the rotational speed ($w_i$) of each of the tires 22A, 22B and axle torque 24A, 24B data. This information is compiled to determine whether the path the vehicle 10 is traveling needs to be adjusted along the curve 30.

Additional sensors 44D-H may be in communication with other components of the vehicle 10, which may be used in the predictive model 41. For example, a sensor 44D may be in communication with the controller 42 to provide the vehicle data regarding the yaw rate (r) of the vehicle 10 at the CG point 95. Another example, a sensor 44E may be in communication with the controller 42 to provide the vehicle data of the lateral acceleration ($\alpha_y$) of the vehicle 10. Yet another example, a sensor 44F may be in communication with the controller 42 to provide the vehicle data of the rotational speed ($w_i$) of each of the tires 22A, 22B. A sensor 44G may also be in communication with the front axle 20A to communicate the axle torque 24A to the controller 42, and another sensor 44H may also be in communication with the rear axle 20B to communicate the axle torque 24B to the controller 42. As such, the predictive model 41 may use data collected via the sensors 44A-44 H regarding the yaw rate of the vehicle 10 at the CG point 95, the lateral acceleration of the vehicle 10, the rotational speed of each of the tires 22A, 22B and the axle torque 24A, 24B data. The data collected via the sensors 44A-44H may be in real-time as the vehicle 10 is in motion.

The predictive model 41 also includes an estimation model 64 for a plurality of estimated vehicle states 24A, 24B, 68, 70, 72, 74, and a reference model 66 that provides a plurality of target values of desired responses. Data of the estimation model 64 is compared with data of the reference model 66. The predictive model 41 uses the comparison of data to determine whether the path the vehicle 10 is traveling needs to be adjusted along the curve 30. Therefore, the memory 46 of the controller 42 also stores the estimation model 64 and the reference model 66. The estimation model 64 may use some of the vehicle data, such as the axle torque ($T_f$) 24A of the front axle 20A and the axle torque ($T_r$) 24B of the rear axle 20B.

The estimated vehicle states 24A, 24B, 68, 70, 72, 74 may include tire forces ($F_x$, $F_y$, $F_z$) 68 on each tire 22A, 22B of the vehicle 10, a velocity ($v_x$, $v_y$) 70 of the vehicle 10, friction 72 between the tire 22A, 22B and a road surface 26A, engine torque 74, the axle torque ($T_f$) 24A of the front axle 20A and the axle torque ($T_r$) 24B of the rear axle 20B. The velocity ($v_x$, $v_y$) 70 may include a longitudinal velocity ($v_x$) of the vehicle 10 at the CG point 95 and/or a lateral velocity ($v_y$) of the vehicle 10 at the CG point 95. Therefore, the estimation model 64 may collect data regarding the tire forces 68 on each tire 22A, 22B of the vehicle 10, the velocity 70 of the vehicle 10, the friction 72 between the tire 22A, 22B and the road surface 26A, the engine torque 74, the axle torque 24A of the front axle 20A and the axle torque 24B of the rear axle 20B. The tire forces 68 are identified as $F_{xi}$, $F_{yi}$, $F_{zi}$ in FIG. 5.

As discussed above, the reference model 66 may provide target values of desired responses of existing vehicle constraints. Generally, the reference model 66 may predict future desired responses of, for example, the first actuator 36A, the second actuator 36B and the eLSD 38. The desired responses generally refer to existing features of the vehicle 10 which may include target ranges of the existing vehicle constraints such as for the first actuator 36A, the second actuator 36B, the eLSD 38, the tire capacity, the clutch 40 and the engine 12. Non-limiting examples of the features/responses are discussed below. The reference model 66 may also be used to store information regarding target values, target ranges, etc. of various characteristics of the vehicle 10. For example, the target values may include a target yaw rate ($r_d$) 76 of the vehicle 10 at the CG point 95 and a target velocity ($v_{yd}$) 78 of the vehicle 10. Therefore, the reference model 66 may collect data regarding the target yaw rate 76 of the vehicle 10 at the CG point 95 and the target velocity 78 of the vehicle 10.

The controller 42 also collects constraint data 80 which is representative of real-time constraints of the vehicle 10, which as discussed below, is communicated to the predictive model 41. The constraint data 80 provide limits of various features of the vehicle 10. The constraint data 80 may include a first actuator constraint 82, a tire capacity 84, a clutch capacity 86 and an engine capacity 88. Therefore, the real-time constraints collected via the predictive model 41 may include the first actuator constraint 82, the tire capacity 84, the clutch capacity 86 and the engine capacity 88. Additionally, the real-time constraints may include a second actuator constraint 90 and/or an eLSD constraint 92. In certain configurations, the real-time constraints collected via the predictive model 41 may also include the second actuator constraint 90 and/or the eLSD constraint 92. The first actuator constraint 82 refers to real-time limits of the first actuator 36A during operation of the vehicle 10 along the curve 30, the second actuator constraint 90 refers to real-time limits of the second actuator 36B during operation of the vehicle 10 along the curve 30 and the eLSD constraint 92 refers to real-time limits of the eLSD 38 during operation of the vehicle 10 along the curve 30. The tire capacity 84 refers to how much tire force is available for usage during operation of the vehicle 10 along the curve 30. The clutch capacity refers to the clutch 40 of the eLSD 38 and the maximum torque that the eLSD 38 may provide during operation of the vehicle 10 along the curve 30. The engine capacity 88 refers to the maximum torque that the engine 12 may provide during operation of the vehicle 10 along the curve 30.

The collected input data 50, the vehicle data, and the constraint data 80 is communicated to the predictive model 41. The predictive model 41 includes the estimation model 64 configured to output the estimated vehicle states 24A, 24B, 68, 70, 72, 74 and the reference model 66 configured to output the target values of the desired responses. Using the predictive model 41, it is determined whether torque adjustments are necessary, including comparing the estimated vehicle states 24A, 24B, 68, 70, 72, 74 from the estimation model 64 to the plurality of target values from the reference model 66.

Generally, the distribution of the axle torque 24A of the front axle 20A and the axle torque 24B of the rear axle 20B is controlled, via the controller 42, when the torque adjustments are necessary as determined via the predictive model 41. The distribution of the axle torque 24A of the front axle 20A and the axle torque 24B of the rear axle 20B is controlled when the controller 42 determines that torque adjustments are necessary based on the data collected via the predictive model 41. The first actuator 36A and/or the second actuator 36B and/or the eLSD 38 may be controlled to adjust the torque 24A, 24B of the front and rear axles 20A, 20B to enhance the stability and handling of the vehicle 10.

Controlling the distribution of the axle torque 24A, 24B may further comprise selectively actuating the first actuator 36A which is coupled to one of the front axle 20A and the rear axle 20B to control front-to-rear axle torque. In certain configurations, the first actuator 36A is coupled to the front axle 20A to control the axle torque 24A of the front axle 20A. The controller 42 may signal the first actuator 36A to operate and make the desired front-to-rear axle torque adjustments. As discussed above, the first actuator 36A may control front-to-rear axle torque, and if the vehicle 10 includes the second actuator 36B, the second actuator 36B may control front-to-rear axle torque. Therefore, in certain configurations, controlling the distribution of the axle torque 24A, 24B may further comprise selectively actuating the second actuator 36B which is coupled to the rear axle 20B to control front-to-rear axle torque. The controller 42 may signal the second actuator 36B to operate and make the desired front-to-rear axle torque adjustments. The first and second actuators 36A, 36B may be actuated simultaneously or at the same time, or the first and second actuators 36A, 36B may be actuated at different times from each other.

Regardless of whether one or two actuators 36A, 36B are utilized for the vehicle 10, the eLSD 38 may also be used for the vehicle 10, and as discussed above, the eLSD 38 controls lateral torque. Controlling the distribution of the axle torque 24A, 24B may further comprise selectively actuating the eLSD 38 which is coupled to the other one of the front axle 20A and the rear axle 20B to control the distribution of torque 24A, 24B laterally of the respective front axle 20A and the respective rear axle 20B to control slip of one or more tires 22A, 22B of the vehicle 10. The controller 42 may signal the eLSD 38 to operate and make the desired lateral torque adjustments. The eLSD 38 may be actuated simultaneously or at the same time as one or both of the first and second actuators 36A, 36B, or the eLSD 38 may be actuated at different times from one or both of the first and second actuators 36A, 36B.

For example, if the vehicle 10 includes the first actuator 36A and the eLSD 38, the first actuator 36A is coupled to one of the axles 20A, 20B and the eLSD 38 is coupled to the other one of the axles 20A, 20B. As another example, if the vehicle 10 includes the first actuator 36A and the second actuator 36B, the first actuator 36A is coupled to the front axle 20A and the second actuator 36B is coupled to the rear axle 20B. As yet another example, if the vehicle 10 includes the first actuator 36A, the second actuator 36B and the eLSD 38, the first actuator 36A is coupled to the front axle 20A, the second actuator 36B is coupled to the rear axle 20B and the eLSD 38 is coupled to the front axle 20A or the rear axle 20B. Therefore, generally, the controller 42 may signal the first actuator 36A and/or the second actuator 36B and/or the eLSD 38 to operate and make the desired torque adjustments to enhance stability and handling of the vehicle 10 along the curve 30 of the road 26.

Controlling the distribution of the axle torque 24A, 24B may further include calculating slip of one or more of the tires 22A, 22B. Therefore, the predictive model 41 may include a tire model 94 that compiles information regarding one or more of the tires 22A, 22B of the vehicle 10. The tire model 94 collects real-time data of the vehicle 10 in motion. Specifically, the tire model 94 may provide information regarding slip of one or more of the tires 22A, 22B of the vehicle 10 as the vehicle 10 travels along the road 26. Therefore, lateral tire force may be obtained via the tire model 94. The tire model 94 may include equation (1):

$$F_{yi} = F_{zi}\mu_{yi} = F_{zi}\left(\frac{\rho_i}{\sqrt{v_{xi}^2\alpha_i^2 + \epsilon_i^2 s_i^2} + \gamma_i\rho_i} + \sigma_{2y}\right)v_{xi}\alpha_i \quad (1)$$

wherein:
$F_{yi}$=a force on the tires 22A, 22B on a y-axis (see FIG. 5);
$F_{zi}$=a force on the tires 22A, 22B on a z-axis (see FIG. 5);
$\mu_{yi}$=a normalize tire lateral force on the tires 22A, 22B;
$\rho_i$=a variable related to a tire transient function and road condition;
$\sigma_{2y}$=a relative viscous damping of the tire model 94 on the y-axis;
$v_{xi}$=a velocity of the tires 22A, 22B on a x-axis;
$\alpha_i$=a side slip angle of the tires 22A, 22B;
$\epsilon_i$=a variable related to wheel slip;
$s_i$=a slip ratio of the tires 22A, 22B; and
$\gamma_i$=a variable related to the wheel slip and tire rubber stiffness.

Figure 5:
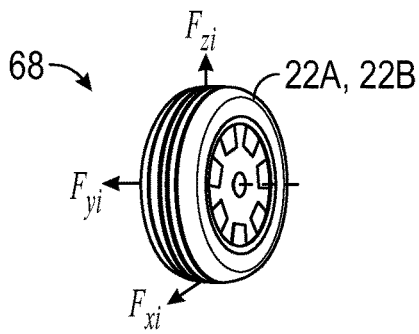
FIG. 5 is a schematic perspective view of a tire.

$F_{yi}$ and $F_{zi}$ are identified in FIG. 5. The tire model 94 may include equation (1) to determine slip of one or more of the tires 22A, 22B. The derivative of $F_{yi}$ is obtained from equation (2):

$$\dot{F}_{yi} = F_{zi}\left(\frac{\partial \mu_{yi}}{\partial s_i}\dot{s}_i + \frac{\partial \mu_{yi}}{\partial \alpha_i}\dot{\alpha}_i\right) \quad (2)$$

wherein:
$F_{yi}$, $F_{zi}$, $\mu_{yi}$, $\alpha_i$ and $s_i$ are defined above; and
$\partial$=partial derivative.
$\dot{F}_{yi}$ is associated or connected with the torque of the engine 12, and $\dot{F}_{yi}$ of equation (2) may be re-written as equation (3):

$$\dot{F}_{yi} = \underbrace{\frac{F_{zi}(1 \mp s_i)}{w_i}\frac{\partial \mu_{yi}}{\partial s_i}}_{\nabla F_{s_i}}w_i + \underbrace{\frac{F_{zi}}{v_x}\frac{\partial \mu_{yi}}{\partial \alpha_i}}_{\nabla F_{\alpha_i}}\alpha_i v_x \quad (3)$$

wherein:
$F_{yi}$, $F_{zi}$, $\alpha_i$, $\partial$, $\mu_{yi}$ and $s_i$ are defined above;
$v_x$=a longitudinal velocity of the vehicle 10 at the CG point 95;
$w_i$=a rotational speed of each of the tires 22A, 22B;
$\nabla F_{s_i}$=a coefficient of a partial derivative with respect to a slip ratio of the tires 22A, 22B; and
$\nabla F_{\alpha_i}$=a coefficient of a partial derivative with respect to side slip angles of the tires 22A, 22B.

Using equation (3), $\dot{F}_y$ is obtained in the matrix form from equation (4):

$$\dot{F}_y = -\underbrace{\begin{bmatrix} -\nabla F_{\alpha_1} & -l_f\nabla F_{\alpha_1} & 0 \\ -\nabla F_{\alpha_2} & -l_f\nabla F_{\alpha_2} & 0 \\ -\nabla F_{\alpha_3} & l_r\nabla F_{\alpha_3} & 0 \\ -\nabla F_{\alpha_4} & l_r\nabla F_{\alpha_4} & 0 \end{bmatrix}}_{A_2}\begin{bmatrix} \dot{v}_y \\ \dot{r} \\ \dot{M}_{zCG} \end{bmatrix} +$$

$$\underbrace{\begin{bmatrix} \nabla F_{s_1}/2I_w & 0 & 0 \\ \nabla F_{s_2}/2I_w & 0 & 0 \\ 0 & \nabla F_{s_3}/2I_w & \nabla F_{s_3}/2I_w \\ 0 & \nabla F_{s_4}/2I_w & -\nabla F_{s_4}/2I_w \end{bmatrix}}_{B_2}\underbrace{\begin{bmatrix} \Delta T_f \\ \Delta T_r \\ \Delta T_c \end{bmatrix}}_{u} +$$

$$\underbrace{\begin{bmatrix} \frac{\nabla F_{s_1}}{2I_w} & 0 & 0 & 0 \\ 0 & \frac{\nabla F_{s_2}}{2I_w} & 0 & 0 \\ 0 & 0 & \frac{\nabla F_{s_3}}{2I_w} & 0 \\ 0 & 0 & 0 & \frac{\nabla F_{s_4}}{2I_w} \end{bmatrix}}_{G_2}\underbrace{\begin{bmatrix} T_{d,f} - 2R_w F_{x1} \\ T_{d,f} - 2R_w F_{x2} \\ T_{d,r} + T_c - 2R_w F_{x2} \\ T_{d,r} - T_c - 2R_w F_{x4} \end{bmatrix}}_{d_2}$$

wherein:
$F_y$=a lateral tire force on each of the tires 22A, 22B;
$l_f$=a length between the front axle 20A and the CG point 95 of vehicle 10 (see FIG. 6);
$l_r$=a length between the rear axle 20B and the CG point 95 of vehicle 10 (see FIG. 6);
$\nabla F_{\alpha_1}$=a coefficient of a partial derivative with respect to a side slip angle of a left-hand front tire 22A;
$\nabla F_{\alpha_2}$=a coefficient of a partial derivative with respect to a side slip angle of a right-hand front tire 22A;
$\nabla F_{\alpha_3}$=a coefficient of a partial derivative with respect to a side slip angle of a left-hand rear tire 22B;
$\nabla F_{\alpha_4}$=a coefficient of a partial derivative with respect to a side slip angle of a right-hand rear tire 22AB;
$F_{s_1}$=a coefficient of a partial derivative with respect to a slip ratio of a left-hand front tire 22A;
$F_{s_2}$=a coefficient of a partial derivative with respect to a slip ratio of a right-hand front tire 22A;
$F_{s_3}$=a coefficient of a partial derivative with respect to a slip ratio of a left-hand rear tire 22B;
$F_{s_4}$=a coefficient of a partial derivative with respect to a slip ratio of a right-hand rear tire 22B;
$I_w$=a wheel mass moment of rolling inertia of the tires 22A, 22B;
$T_{d,f}$=the torque 24A input of the front axle 24A due to the input data 50;
$T_{d,r}$=the torque 24B input of the rear axle 24B due to the input data 50;
$T_c$=the torque of the clutch 40 of the eLSD 38;
$R_w$=a wheel effective rolling radius;
$F_{x1}$=a force along a x-axis of one of the front tires 22A (see FIG. 6);
$F_{x2}$=a force along a x-axis of another one of the front tires 22A (see FIG. 6);
$F_{x3}$=a force along a x-axis of one of the rear tires 22B (see FIG. 6);
$F_{x4}$=a force along a x-axis of one of the rear tires 22B (see FIG. 6);
$v_y$=a lateral velocity of the vehicle 10 at the CG point 95;
$r$=a yaw rate of the vehicle 10 at the CG point 95;
$M_{zCG}$=a total yaw moment of the vehicle 10 at the CG point 95;
$\Delta T_f$=an adjustment of the front axle torque 24A;
$\Delta T_r$=an adjustment of the rear axle torque 24B; and
$\Delta T_c$=an adjustment of a clutch 40 of the eLSD 38.

Equation (4) identifies $A_2$, $B_2$, u, $G_2$, and $d_2$ by bracketing the respective portions of the equation that these symbols represent. Therefore, the matrix form of $\dot{F}_y$ from equation (4) may be reduced to equation (5):

$$\dot{F}_y = A_2 \dot{x} + B_2 u + G_2 d_2 \qquad (5)$$

wherein:

$$\dot{x} = \begin{bmatrix} \dot{v}_y \\ \dot{r} \\ \dot{M}_{z_{CG}} \end{bmatrix}$$

$v_y$, $r$ and $M_{z_{CG}}$ are defined above.

Equation (5) is inserted into another equation to obtain equations (6) and (7), which will be further discussed below. Various vehicle states, which includes the behavior of the tires 22A, 22B from the tire model 94 is modeled with enough detail to include the effects of the axle torque 24A, 24B and slip conditions. Therefore, controlling the distribution of the axle torque 24A, 24B may further comprise calculating whether adjustments of the axle torque 24A, 24B are necessary through the predictive model 41 using equations (6) and (7):

$$\dot{x} = \overline{A}_c x + \overline{B}_c u + \overline{d}_c \qquad (6)$$

$$y = C_c x \qquad (7)$$

wherein:
$x = [v_y\ r\ M_{z_{CG}}]^T$;
$y = [v_y\ r]^T$;
$u = [\Delta T_f\ \Delta T_r\ \Delta T_c]^T$;
$v_y$, $r$ and $M_{z_{CG}}$ are defined above;
$\Delta T_f$, $\Delta T_r$, and $\Delta T_c$ are defined above;
$T$ = a weight matrix emphasizing torque shifting issues;
$\overline{A}_c$ = a system matrix of time-varying;
$\overline{B}_c$ = an input matrix of time-varying;
$\overline{d}_c$ = a disturbance term that includes the input data 50; and
$C_c$ = an output matrix.

Figure 6:
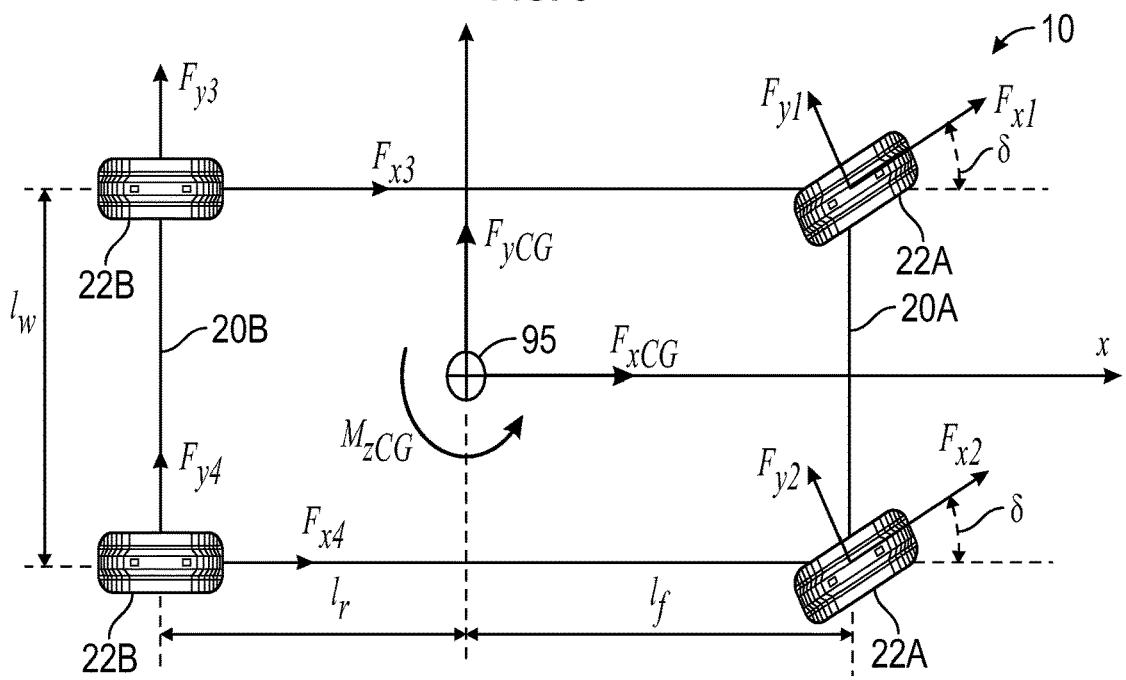
FIG. 6 is a schematic illustration of the vehicle identifying various forces, moments, steering angles, etc.

Also see FIGS. 4 and 6 which include some of the symbols identified immediately above for equations (6) and (7). Furthermore, the predictive model 41 uses various states of the vehicle 10, via equation (8):

$$x = [v_y\ r\ M_{z_{CG}}]^T \qquad (8)$$

wherein:
$M_{z_{CG}}$ is defined above as a total yaw moment of the vehicle 10 at the CG point 95, and is also representative by equation: $M_{z_{CG}} = -l_w(F_{x3} - F_{x4})/2 + l_f(F_{x1} \sin \delta + F_{y1} \cos \delta + F_{x2} \sin \delta + F_{y2} \cos \delta) - l_r(F_{y3} + F_{y4})$;
$l_f$, $l_r$, $F_{x1}$, $F_{x2}$, $F_{x3}$, $F_{x4}$, $T$, $v_y$, and $r$ are defined above;
$l_w$ = a length between respective tires 22A, 22B (see FIG. 6);
$F_{y1}$ = a force along a y-axis of one of the front tires 22A (see FIG. 6);
$F_{y2}$ = a force along a y-axis of another one of the front tires 22A (see FIG. 6);
$F_{y3}$ = a force along a y-axis of one of the rear tires 22B (see FIG. 6);
$F_{y4}$ = a force along a y-axis of one of the rear tires 22B (see FIGS. 6); and
$\delta$ = the steering angle (see FIG. 6).

The derivative of equation $M_{z_{CG}}$ identified above is obtained from equation (9):

$$\dot{M}_{z_{CG}} = -l_w(\dot{F}_{x3} - \dot{F}_{x4})/2 + l_f(\dot{F}_{y1}\cos\delta) - l_r(\dot{F}_{y3} + \dot{F}_{y4}) \qquad (9)$$

wherein:
$l_f$, $l_r$, $l_w$, $F_{x3}$, $F_{x4}$, $F_{y1}$, $F_{y2}$, $F_{y3}$, $F_{y4}$ and $\delta$ are defined above.

Lateral tire forces contribute to the lateral dynamics of the vehicle 10, and the lateral tire forces are affected by longitudinal tire force distribution. Therefore, various vehicle states, which includes the lateral tire forces are modeled via equation (10):

$$\begin{bmatrix} \dot{v}_y \\ \dot{r} \\ \dot{M}_{z_{CG}} \end{bmatrix} = \underbrace{\begin{bmatrix} 0 & -v_x & 0 \\ 0 & 0 & 1/I_{zz} \\ 0 & 0 & 0 \end{bmatrix}}_{A_1} \begin{bmatrix} v_y \\ r \\ M_{z_{CG}} \end{bmatrix} + \underbrace{\begin{bmatrix} 0 & 0 & 0 \\ 0 & 0 & 0 \\ 0 & 0 & -l_w/2\tau R_w \end{bmatrix}}_{B_1} \underbrace{\begin{bmatrix} \Delta T_f \\ \Delta T_r \\ \Delta T_c \end{bmatrix}}_{u} + \qquad (10)$$

$$\underbrace{\begin{bmatrix} 0 & 0 & 0 & 0 \\ 0 & 0 & 0 & 0 \\ l_f \cos\delta & l_f \cos\delta & -l_r & -l_r \end{bmatrix}}_{C_1} \dot{F}_y +$$

$$\underbrace{\begin{bmatrix} a_y \\ 0 \\ l_w(F_{x3} - F_{x4})/2\tau - l_w T_c/2\tau R_w \end{bmatrix}}_{d_1}$$

wherein:
$l_f$, $l_r$, $l_w$, $\dot{F}_y$, $F_{x3}$, $F_{x4}$, $\delta$, $R_w$, $T_c$, $v_x$, $v_y$, $r$, $M_{z_{CG}}$, $\Delta T_f$, $\Delta T_r$, and $\Delta T_c$ are defined above.
$I_{zz}$ = an inertial of yaw moment of the vehicle 10;
$a_y$ = a measured lateral acceleration of the vehicle 10; and
$\tau$ = a time constant of the eLSD 38.

Various vehicle states, which include the lateral tire forces of equation (10) is used via the predictive model 41 to obtain equations (6) and (7). Equation (10) identifies $A_1$, $B_1$, $u$, $C_1$, and $d_1$ by bracketing the respective portions of the equation that these symbols represent. Therefore, the matrix form of equation (10) is reduced to equation (11):

$$\dot{x} = A_1 x + B_1 u + C_1 \dot{F}_y + d_1 \qquad (11)$$

wherein:

$$x = \begin{bmatrix} v_y \\ r \\ M_{z_{CG}} \end{bmatrix}$$

$v_y$, $r$ and $M_{z_{CG}}$ are defined above.

Equation (5) is inserted into equation (11) to obtain equations (6) and (7). Therefore, the predictive model 41 uses equations (6) and (7) to determine the vehicle's state during real-time travel of the vehicle, and thus, to determine whether adjustments of torque 24A, 24B of the front and/or rear axle 20A, 20B are needed to enhance the stability and handling of the vehicle 10 as the vehicle 10 travels along the curve 30 in the road 26.

The predictive model 41 may also include a cost function model 96 that may predict future characteristics of the vehicle 10 for a defined time horizon to give a future preview of optimal control of the vehicle 10. The cost function model 96 may predict future characteristics of the vehicle 10, such as tracking issues which may include the yaw rate ($r$) of the vehicle 10 at a center of gravity (CG) point 95 and the lateral velocity ($v_y$) of the vehicle 10, as well as control efforts, such as the torque 24A control of the front axle 20A and the torque 24B control of the rear axle 20B. The cost function model 96 may also predict future characteristics of the driver's torque request ($\Delta T_f(k) + \Delta T_r(k)$), which for example, balances the overall driver torque request by ensuring that if torque is removed from the rear axle 20B, the amount of torque removed from the rear is added to the front axle 20A, and vice versa. The cost function model 96 may also predict future characteristics of the amount of braking 54 requested and the amount of acceleration 56 requested. By predicting various characteristics of the vehicle 10 via the cost function model 96, an optimal solution may be found for the axle torque distribution, and thus, position the vehicle 10 along the curve 30 as desired, thus minimizing oversteering and understeering.

Generally, the cost function model 96 changes the problem in real-time from a control problem to an optimization problem. The cost function model 96 provides various control objectives and enough detail regarding future characteristics of the vehicle 10 to tune the controller 42 in order to provide the optimal axle torque distribution. The cost function model 96 may include equation (12):

$$U^* = \text{argmin}: J(x(t), U_t) = \Sigma_{k=1}^{N_p} \|y_{t+k,t} - y_{dt+k,t}\|_Q^2 + \Sigma_{k=0}^{N_p-1} \|u_{t+k,t}\|_R^2 + \Sigma_{k=0}^{N_p-1} \|e_{t+k,t}\|_T^2 \quad (12)$$

wherein:
U*=a sequence of optimal future control actions;
J=a defined cost function for a formulation of a control problem to a optimization problem;
x(t)=a current state of x, where x is defined above as [$v_y$ r $M_{z_{CG}}$]$^T$;
$U_t$=a defined total sequence or vector of control inputs that includes the axle torque ($T_f$) 24A of the front axle 20A, the axle torque ($T_r$) 24B of the rear axle 20B and the torque ($T_c$) of the clutch 40 of the eLSD 38;
$N_p$=a number of prediction horizon (in other words, how far in the future is the prediction);
k=the $k^{th}$ step in the defined horizon $N_p$;
$y_{t+k,t}$=the $k^{th}$ predicted actual output of equations (6) and (7);
$y_{dt+k,t}$=the $k^{th}$ desired output from the reference model 66;
Q=a weight matrix emphasizing tracking issues;
$u_{t+k,t}$=the $k^{th}$ predicted control input of equations (6) and (7);
R=a weight matrix emphasizing control efforts;
$e_{t+k,t}$=a summation of the adjustments of the torque 24A, 24B of the front and rear axles 20A, 20B; and
T=a weight matrix emphasizing torque shifting issues.

The predictive model 41 may also include a dynamic model 98 that provides real-time optimization of the axle torque 24A, 24B of the vehicle 10. The dynamic model 98 is configured to determine the optimal future control sequence of the axle torque 24A, 24B while minimizing the cost via the cost function model 96. Optimization may be provided via quadratic programming. A quadratic programming problem may be solved in real-time at every time step to find the control action having the lowest cost by using the quadratic programming. By predicting into the future, the controller 42 is able to consider the effects of the axle torque distribution before the axle torques 24A, 24B occur. The dynamic model 98 combines equations (6), (7) and (12) to obtain equation (13):

$$\min_U : J = \frac{1}{2} U^T H U + U^T g \quad (13)$$
$$\text{s.t.} \quad LB < U < UB$$

wherein:
$\min_U$ = an abbreviation for minimize;

J=a defined cost function for a formulation of the control problem to the optimization problem;

U=a defined total sequence or vector of control inputs, which is the same as $U_t$ defined above;
$U^T$=a transpose (matrix) of vector U;
H=the Hessian matrix of the quadratic formulation of J, which is a coefficient of second order linear terms;
g=a vector that contains first order linear terms, which is a coefficient of first order linear terms;
s.t.=an abbreviation for "subject to" various constraints;
LB=a structured lower boundary of U; and
UB=a structured upper boundary of U.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling axle torque distribution of a front axle and a rear axle of a vehicle during steering of the vehicle through a curve; the method comprising:
   collecting, via a controller:
      input data which is representative of a plurality of vehicle inputs;
      vehicle data which is representative of axle torque of the front axle and axle torque of the rear axle;
      constraint data which is representative of real-time constraints of the vehicle;
   communicating the collected input data, vehicle data and constraint data to a predictive model, wherein the predictive model includes an estimation model configured to output a plurality of estimated vehicle states and a reference model configured to output a plurality of target values of desired responses;
   determining, using the predictive model, whether torque adjustments are necessary, including comparing the estimated vehicle states from the estimation model to the plurality of target values from the reference model; and
   controlling the distribution of the axle torque of the front axle and the axle torque of the rear axle, via the controller, when the torque adjustments are necessary as determined via the predictive model.

2. The method as set forth in claim 1 wherein controlling the distribution of the axle torque further comprises selectively actuating a first actuator which is coupled to one of the front axle and the rear axle to control front-to-rear axle torque.

3. The method as set forth in claim 2 wherein controlling the distribution of the axle torque further comprises selectively actuating an electronic limited slip differential (eLSD) which is coupled to the other one of the front axle and the rear axle to control the distribution of the axle torque laterally of the respective front axle and the respective rear axle to control slip of one or more tires of the vehicle.

4. The method as set forth in claim 3 wherein the first actuator is coupled to the front axle to control the axle torque of the front axle, and wherein controlling the distribution of the axle torque further comprises selectively actuating a second actuator which is coupled to the rear axle to control front-to-rear axle torque.

5. The method as set forth in claim 4 wherein collecting, via the controller, includes collecting data regarding the actuation of the first actuator, the second actuator and the eLSD.

6. The method as set forth in claim 4 wherein controlling the distribution of the axle torque further comprises calculating whether adjustments of the axle torque are necessary using the equations:

$$\dot{x} = \overline{A}_c x + \overline{B}_c u + \overline{d}_c y = C_c x$$

wherein:
$x = [v_y, r, M_{z_{CG}}]^T$;
$y = [v_y, r]^T$;
$v_y$ = a lateral velocity of the vehicle at a center of gravity point;
$r$ = a yaw rate of the vehicle at the center of gravity point;
$M_{z_{CG}}$ = a total yaw moment of the vehicle at the center of gravity point;
$u = [\Delta T_f, \Delta T_r, \Delta T_c]^T$;
$\Delta T_f$ = adjustment of the front axle torque;
$\Delta T_r$ = adjustment of the rear axle torque; and
$\Delta T_c$ = adjustment of a clutch of the eLSD.

7. The method as set forth in claim 1 wherein controlling the distribution of the axle torque further comprises calculating slip of one or more tires of the vehicle.

8. The method as set forth in claim 1 wherein the estimated vehicle states includes tire forces on each tire of the vehicle, a velocity of the vehicle, friction between the tire and a road surface, engine torque, the axle torque of the front axle and the axle torque of the rear axle.

9. The method as set forth in claim 1 wherein the vehicle inputs include one or more of a steering angle, an amount of braking and an amount of acceleration.

10. The method as set forth in claim 1 wherein the target values include a target yaw rate of the vehicle at a center of gravity point and a target velocity of the vehicle.

11. The method as set forth in claim 1 wherein the constraint data includes a first actuator constraint, a tire capacity, a clutch capacity and an engine capacity.

12. The method as set forth in claim 1 wherein the predictive model includes a cost function model.

13. The method as set forth in claim 1 wherein:
the estimated vehicle states include tire forces on each tire of the vehicle, a velocity of the vehicle, friction between the tire and a road surface, engine torque, the axle torque of the front axle and the axle torque of the rear axle;
the vehicle inputs include one or more of a steering angle, an amount of braking and an amount of acceleration;
the target values include a target yaw rate of the vehicle at a center of gravity point and a target velocity of the vehicle;
the constraint data includes a first actuator constraint, a tire capacity, a clutch capacity and an engine capacity;
controlling the distribution of the axle torque further comprises selectively actuating a first actuator which is coupled to the front axle to control front-to-rear axle torque;
controlling the distribution of the axle torque further comprises selectively actuating a second actuator which is coupled to the rear axle to control front-to-rear axle torque; and
controlling the distribution of the axle torque further comprises selectively actuating an electronic limited slip differential (eLSD) which is coupled to one of the front axle and the rear axle to control the distribution of the axle torque laterally of the respective front axle and the respective rear axle to control slip of one or more tires of the vehicle.

14. A method of controlling axle torque distribution of a vehicle during steering of the vehicle around a curve; the method comprising:
collecting, via a controller:
input data which is representative of a plurality of vehicle inputs;
vehicle data which is representative of axle torque of a front axle and axle torque of a rear axle;
constraint data which is representative of real-time constraints of the vehicle;
communicating the collected input data, vehicle data and constraint data to a predictive model, wherein the predictive model includes an estimation model configured to output a plurality of estimated vehicle states and a reference model configured to output a plurality of target values of desired responses;
determining, using the predictive model, whether torque adjustments are necessary, including comparing the estimated vehicle states from the estimation model to the plurality of target values from the reference model; and
calculating whether adjustments of the axle torque are necessary through the predictive model using the equations:

$$\dot{x} = \overline{A}_c x + \overline{B}_c u + \overline{d}_c y = C_c x$$

wherein:
$x = [v_y, r, M_{z_{CG}}]^T$;
$y = [v_y, r]^T$;
$v_y$ = a lateral velocity of the vehicle at a center of gravity point;
$r$ = a yaw rate of the vehicle at the center of gravity point;
$M_{z_{CG}}$ = a total yaw moment of the vehicle at the center of gravity point;
$u = [\Delta T_f, \Delta T_r, \Delta T_c]^T$;
$\Delta T_f$ = adjustment of the front axle torque;
$\Delta T_r$ = adjustment of the rear axle torque; and
$\Delta T_c$ = adjustment of a clutch of an electronic limited slip differential;
controlling the distribution of the axle torque of the front axle and the axle torque of the rear axle, via the controller, when the torque adjustments are necessary.

15. The method as set forth in claim 14 wherein controlling the distribution of the axle torque further comprises calculating slip of one or more tires of the vehicle.

16. The method as set forth in claim 14 wherein controlling the distribution of the axle torque further comprises selectively actuating a first actuator which is coupled to one of the front axle and the rear axle to control front-to-rear axle torque.

17. The method as set forth in claim 16 wherein controlling the distribution of the axle torque further comprises selectively actuating the electronic limited slip differential (eLSD) which is coupled to the other one of the front axle and the rear axle to control the distribution of the axle torque laterally of the respective front axle and the respective rear axle to control slip of one or more tires of the vehicle.

18. The method as set forth in claim 17 wherein the first actuator is coupled to the front axle to control the axle torque of the front axle, and wherein controlling the distribution of the axle torque further comprises selectively actuating a second actuator which is coupled to the rear axle to control front-to-rear axle torque.

19. The method as set forth in claim 18 wherein collecting, via the controller, includes collecting data regarding the actuation of the first actuator, the second actuator and the eLSD.

* * * * *